US011815268B2

(12) United States Patent
Dai et al.

(10) Patent No.: US 11,815,268 B2
(45) Date of Patent: Nov. 14, 2023

(54) MAIN MIXER IN AN AXIAL STAGED COMBUSTOR FOR A GAS TURBINE ENGINE

(71) Applicant: Raytheon Technologies Corporation, Farmington, CT (US)

(72) Inventors: Zhongtao Dai, West Hartford, CT (US); Lance L. Smith, West Hartford, CT (US); Jeffrey M. Cohen, Hebron, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/370,154

(22) Filed: Jul. 8, 2021

(65) Prior Publication Data
US 2021/0372622 A1    Dec. 2, 2021

Related U.S. Application Data

(62) Division of application No. 15/371,653, filed on Dec. 7, 2016, now Pat. No. 11,149,952.

(51) Int. Cl.
*F23R 3/28* (2006.01)
*F23R 3/14* (2006.01)
(52) U.S. Cl.
CPC ............ *F23R 3/286* (2013.01); *F23R 3/14* (2013.01); *F23R 2900/03041* (2013.01); *F23R 2900/03042* (2013.01); *F23R 2900/03044* (2013.01); *Y02T 50/60* (2013.01)
(58) Field of Classification Search
CPC .... F23R 3/14; F23R 3/28; F23R 3/286; F23R 3/283; F23R 3/343; F23R 3/16; F23R 3/12; F23R 2900/03041; F23R 2900/03042; F23D 2900/11101; Y02T 50/60
See application file for complete search history.

(56) References Cited

U.S. PATENT DOCUMENTS 3,980,233 A * 9/1976 Simmons .............. F23D 11/107
                                                    239/404
4,974,416 A * 12/1990 Taylor .................... F23D 11/10
                                                    239/404

(Continued)

FOREIGN PATENT DOCUMENTS

EP    2481987 A2    8/2012
EP    3062022 A1    8/2016
(Continued)

OTHER PUBLICATIONS

Annex to European Search Report for EP Appln. No. 15768006.7 dated Sep. 15, 2017.

(Continued)

*Primary Examiner* — Craig Kim
(74) *Attorney, Agent, or Firm* — Bachman & LaPointe, P.C.

(57) ABSTRACT

A main mixer including a swirler along an axis, the swirler including an outer swirler with a multiple of outer vanes, and a center swirler with a multiple of center vanes and a swirler hub along the axis, the swirler hub including a fuel manifold and an inner swirler with a multiple of inner vanes that support a centerbody, the multiple of inner vanes interconnect the fuel manifold and the centerbody.

14 Claims, 12 Drawing Sheets

(56) References Cited

U.S. PATENT DOCUMENTS

| | | | |
|---|---|---|---|
| 5,020,329 A * | 6/1991 | Ekstedt | F23R 3/28 60/737 |
| 5,207,064 A * | 5/1993 | Ciokajlo | F23R 3/34 60/737 |
| 5,351,475 A * | 10/1994 | Ansart | F23R 3/50 60/746 |
| 5,392,720 A * | 2/1995 | Briggs | F23D 1/02 239/404 |
| 5,826,423 A | 10/1998 | Lockyer | |
| 6,038,861 A * | 3/2000 | Amos | F23R 3/34 60/737 |
| 6,119,459 A * | 9/2000 | Gomez | F23C 7/004 60/748 |
| 6,253,538 B1 | 7/2001 | Sampath et al. | |
| 6,324,828 B1 | 12/2001 | Willis et al. | |
| 6,625,971 B2 | 9/2003 | Graves | |
| 7,134,286 B2 | 11/2006 | Markarian et al. | |
| 7,140,189 B2 | 11/2006 | Markarian et al. | |
| 7,185,497 B2 | 3/2007 | Dudebout et al. | |
| 7,269,958 B2 | 9/2007 | Stastny et al. | |
| 7,308,794 B2 | 12/2007 | Morenko et al. | |
| 7,559,202 B2 | 7/2009 | Prociw et al. | |
| 7,565,803 B2 | 7/2009 | Li et al. | |
| 7,624,576 B2 | 12/2009 | Alkabie et al. | |
| 7,631,500 B2 * | 12/2009 | Mueller | F23R 3/286 60/737 |
| 7,658,339 B2 | 2/2010 | Prociw et al. | |
| 7,669,421 B2 * | 3/2010 | Saitoh | F23R 3/14 60/737 |
| 7,716,931 B2 | 5/2010 | Mancini et al. | |
| 7,721,436 B2 | 5/2010 | Prociw et al. | |
| 7,762,073 B2 | 7/2010 | Li et al. | |
| 7,779,636 B2 * | 8/2010 | Buelow | F23R 3/14 60/742 |
| 7,926,744 B2 * | 4/2011 | Thomson | F23R 3/14 239/405 |
| 7,942,003 B2 * | 5/2011 | Baudoin | F23R 3/343 60/752 |
| 7,950,233 B2 | 5/2011 | Alkabie et al. | |
| 8,061,142 B2 | 11/2011 | Kastrup et al. | |
| 8,146,365 B2 | 4/2012 | Shum et al. | |
| 8,171,734 B2 * | 5/2012 | McMasters | F23R 3/343 60/748 |
| 8,171,736 B2 | 5/2012 | Hawie et al. | |
| 8,312,724 B2 * | 11/2012 | Dai | F23R 3/286 60/737 |
| 8,387,391 B2 * | 3/2013 | Patel | F23R 3/60 60/740 |
| 8,459,017 B2 | 6/2013 | Paterson et al. | |
| 8,646,275 B2 * | 2/2014 | Rackwitz | F23D 11/107 60/737 |
| 9,109,553 B2 * | 8/2015 | Matsuyama | F23R 3/343 |
| 9,188,341 B2 * | 11/2015 | McMasters | F23R 3/286 |
| 9,303,875 B2 * | 4/2016 | Clemen | F23R 3/50 |
| 9,376,985 B2 * | 6/2016 | Burd | F23R 3/14 |
| 9,404,656 B2 * | 8/2016 | Burd | F23R 3/10 |
| 9,429,324 B2 * | 8/2016 | Matsuyama | F23R 3/14 |
| 9,441,836 B2 * | 9/2016 | Cohen | F23R 3/28 |
| 9,488,108 B2 * | 11/2016 | Ryon | F23R 3/286 |
| 9,920,693 B2 | 3/2018 | Hanson | |
| 10,054,312 B2 | 8/2018 | Dai et al. | |
| 10,132,500 B2 * | 11/2018 | Ryon | F23R 3/12 |
| 10,295,188 B2 * | 5/2019 | Carrotte | F23R 3/14 |
| 10,408,456 B2 * | 9/2019 | Mulcaire | F23R 3/16 |
| 10,502,425 B2 * | 12/2019 | Boardman | F23R 3/286 |
| 10,935,245 B2 * | 3/2021 | Boardman | F02C 7/22 |
| 11,149,952 B2 * | 10/2021 | Dai | F23R 3/14 |
| 2002/0178727 A1 | 12/2002 | Halila | |
| 2003/0046935 A1 | 3/2003 | Halila et al. | |
| 2008/0078181 A1 * | 4/2008 | Mueller | F23R 3/286 60/776 |
| 2008/0236165 A1 | 10/2008 | Baudoin et al. | |
| 2009/0084082 A1 | 4/2009 | Martin et al. | |
| 2010/0050644 A1 * | 3/2010 | Pidcock | F23R 3/343 60/737 |
| 2010/0107644 A1 * | 5/2010 | Wilbraham | F23R 3/14 60/752 |
| 2010/0162710 A1 | 7/2010 | Senior | |
| 2010/0308135 A1 * | 12/2010 | Yamamoto | F23R 3/343 239/402 |
| 2011/0067402 A1 | 3/2011 | Wiebe et al. | |
| 2011/0289928 A1 | 12/2011 | Fox | |
| 2012/0131923 A1 * | 5/2012 | ELKady | F23R 3/286 60/737 |
| 2012/0151928 A1 * | 6/2012 | Patel | F23R 3/36 60/737 |
| 2012/0151930 A1 * | 6/2012 | Patel | F23R 3/286 60/746 |
| 2012/0186202 A1 | 7/2012 | Pandurangan et al. | |
| 2012/0186258 A1 * | 7/2012 | Dai | F23R 3/18 60/748 |
| 2012/0234013 A1 * | 9/2012 | Overman | F23R 3/283 60/746 |
| 2013/0067920 A1 * | 3/2013 | Fox | F02C 7/22 60/738 |
| 2013/0125549 A1 | 5/2013 | Bailey et al. | |
| 2013/0232980 A1 | 9/2013 | Chen et al. | |
| 2014/0157781 A1 * | 6/2014 | Moran | F23R 3/286 60/746 |
| 2014/0165585 A1 * | 6/2014 | Burd | F23R 3/10 60/776 |
| 2016/0003156 A1 | 1/2016 | Hanson | |
| 2016/0195271 A1 | 7/2016 | Kostlin et al. | |
| 2016/0209036 A1 * | 7/2016 | Cheung | F23R 3/14 |
| 2016/0245522 A1 * | 8/2016 | Dai | F23R 3/343 |
| 2017/0089582 A1 * | 3/2017 | Carrotte | F23R 3/14 |
| 2017/0350598 A1 * | 12/2017 | Boardman | F23R 3/14 |
| 2019/0212009 A1 * | 7/2019 | Boardman | F23R 3/58 |
| 2019/0309950 A1 * | 10/2019 | Prociw | F23R 3/286 |
| 2020/0158343 A1 * | 5/2020 | Boardman | F23R 3/18 |
| 2022/0288554 A1 * | 9/2022 | Sankar | B01J 19/30 |
| 2023/0110944 A1 * | 4/2023 | Cornell | F16M 11/245 248/171 |

FOREIGN PATENT DOCUMENTS

| | | | |
|---|---|---|---|
| EP | 3719276 B1 * | 10/2022 | F01D 25/16 |
| WO | 2013043076 A1 | 3/2013 | |
| WO | WO-2019150336 A1 * | 8/2019 | |

OTHER PUBLICATIONS

EPO Official Letter dated Nov. 16, 2020 issued in corresponding EP Appln. No. 17195301.1.

European Search Report dated Oct. 29, 2018 for corresponding EP Appln. No. 17195301.1.

European Search Report dated Jul. 4, 2018 for corresponding EP Appln. No. 17195301.1.

Partial European Search Report dated Dec. 2, 2022 for corresponding EP Application No. 22168013.5.

Extended European Search Report dated Mar. 20, 2023 for corresponding EP Application No. 22168013.5.

* cited by examiner

MAIN MIXER IN AN AXIAL STAGED COMBUSTOR FOR A GAS TURBINE ENGINE

CROSS REFERENCE TO RELATED APPLICATION

This application is a division of U.S. patent application Ser. No. 15/371,653, filed Dec. 7, 2016.

The invention was made with Government support under Contract No. NNC14CA30C (NASA) awarded by the National Aeronautics and Space Administration. The Government has certain rights in the invention.

BACKGROUND

The present disclosure relates to a gas turbine engine and, more particularly, to a combustor section therefor.

Gas turbine engines, such as those which power modern commercial and military aircrafts, include a compressor for pressurizing a supply of air, a combustor for burning a hydrocarbon fuel in the presence of the pressurized air, and a turbine for extracting energy from the resultant combustion gases. The combustor generally includes radially spaced apart inner and outer liners that define an annular combustion chamber therebetween.

Lean-staged liquid-fueled aeroengine combustors provide low NOx and particulate matter emissions, but may be prone to combustion instabilities.

SUMMARY

A main mixer according to one disclosed non-limiting embodiment of the present disclosure can include a swirler along an axis; and a swirler hub along the axis, the swirler hub having a fuel manifold and a centerbody, the centerbody forms an inner surface of a contoured annular mixer passage, and an inner surface of the swirler forms an outer surface of the contoured annular mixer passage A further embodiment of the present disclosure may include that an inner surface of the centerbody is coated with a thermal barrier coatings (TBC).

A further embodiment of the present disclosure may include that the centerbody includes a fuel manifold and an inner swirler with a multiple of inner vanes that support the centerbody, the multiple of inner vanes interconnect the fuel manifold and the centerbody.

A further embodiment of the present disclosure may include that the swirler includes an outer swirler with a multiple of outer vanes, and a center swirler with a multiple of center vanes.

A further embodiment of the present disclosure may include that the centerbody of the swirler hub forms a non-circular inner surface of the contoured annular mixer passage and an inner diameter of the swirler forms a non-circular outer surface of the contoured annular mixer passage.

A further embodiment of the present disclosure may include that an outer surface of the centerbody of the swirler hub forms a multiple of lobes of the contoured annular mixer passage and an inner diameter of the swirler forms a multiple of lobes of the contoured annular mixer passage.

A further embodiment of the present disclosure may include that an outer surface of the centerbody of the swirler hub forms an elliptical shape and an inner diameter of the swirler forms an elliptical shape.

A further embodiment of the present disclosure may include that the centerbody of the swirler hub is offset from the axis.

A further embodiment of the present disclosure may include that an outer surface of the centerbody of the swirler hub forms a non-circular inner surface of the contoured annular mixer passage and an inner diameter of the swirler forms a non-circular outer surface of the contoured annular mixer passage.

A further embodiment of the present disclosure may include that an outer surface of the centerbody of the swirler hub forms a multiple of lobes of the contoured annular mixer passage and an inner diameter of the swirler forms a multiple of lobes of the contoured annular mixer passage.

A further embodiment of the present disclosure may include that an outer surface of the centerbody of the swirler hub forms an elliptical shape and an inner diameter of the swirler forms an elliptical shape.

A further embodiment of the present disclosure may include that an inner surface of the swirler includes an aperture on a windward side thereof.

A further embodiment of the present disclosure may include that an inner surface of the swirler includes a flat on a windward side thereof.

A main mixer according to one disclosed non-limiting embodiment of the present disclosure can include a swirler along an axis; and a swirler hub including a fuel manifold and an inner swirler with a multiple of inner vanes that support a centerbody, the multiple of inner vanes interconnect the fuel manifold and the centerbody, the centerbody offset from the axis.

A further embodiment of the present disclosure may include that an inner surface of the swirler includes an aperture on a windward side thereof.

A further embodiment of the present disclosure may include that an inner surface of the swirler includes a flat on a windward side thereof.

A further embodiment of the present disclosure may include that the fuel manifold is located along the axis.

A main mixer according to one disclosed non-limiting embodiment of the present disclosure can include a swirler including an outer swirler with a multiple of outer vanes, and a center swirler with a multiple of center vanes; and a swirler hub including a fuel manifold and an inner swirler with a multiple of inner vanes that support a centerbody, the multiple of inner vanes interconnect the fuel manifold and the centerbody, an outer surface of the centerbody and an inner diameter of the swirler forms a non-circular annular mixer passage.

A further embodiment of the present disclosure may include that the centerbody includes a multiple of effusion/film cooling passages arranged in a circular distribution through an upstream wall of the centerbody to extend through a sidewall and form non-circular exits.

A further embodiment of the present disclosure may include that the centerbody includes a multiple of impingement cooling passages arranged in a circular distribution in the upstream wall of the centerbody.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
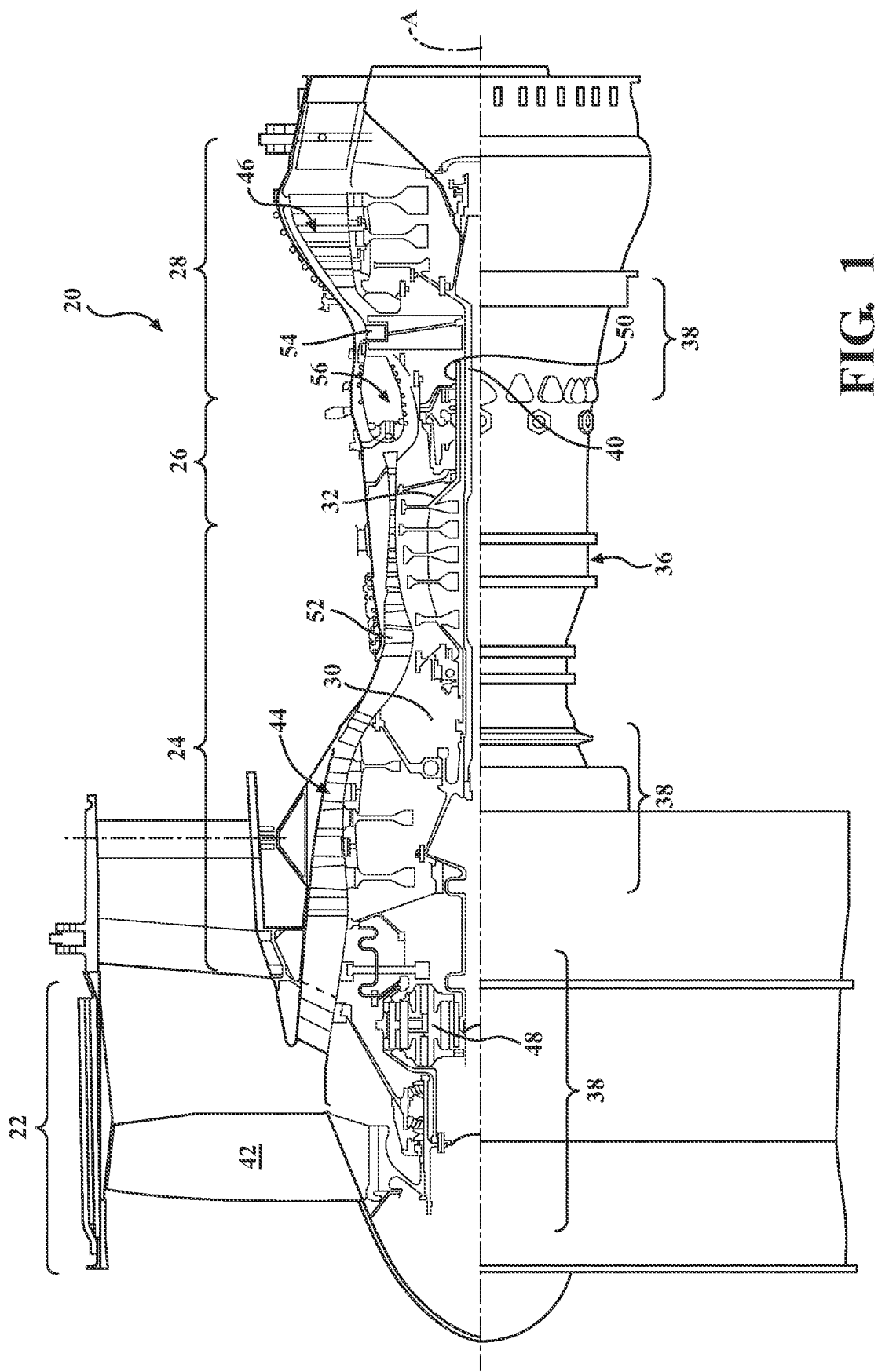
FIG. 1 is a schematic cross-section of an example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by bearing structures 38 within the static structure 36. It should be understood that various bearing structures 38 at various locations may alternatively or additionally be provided.

Figure 2:
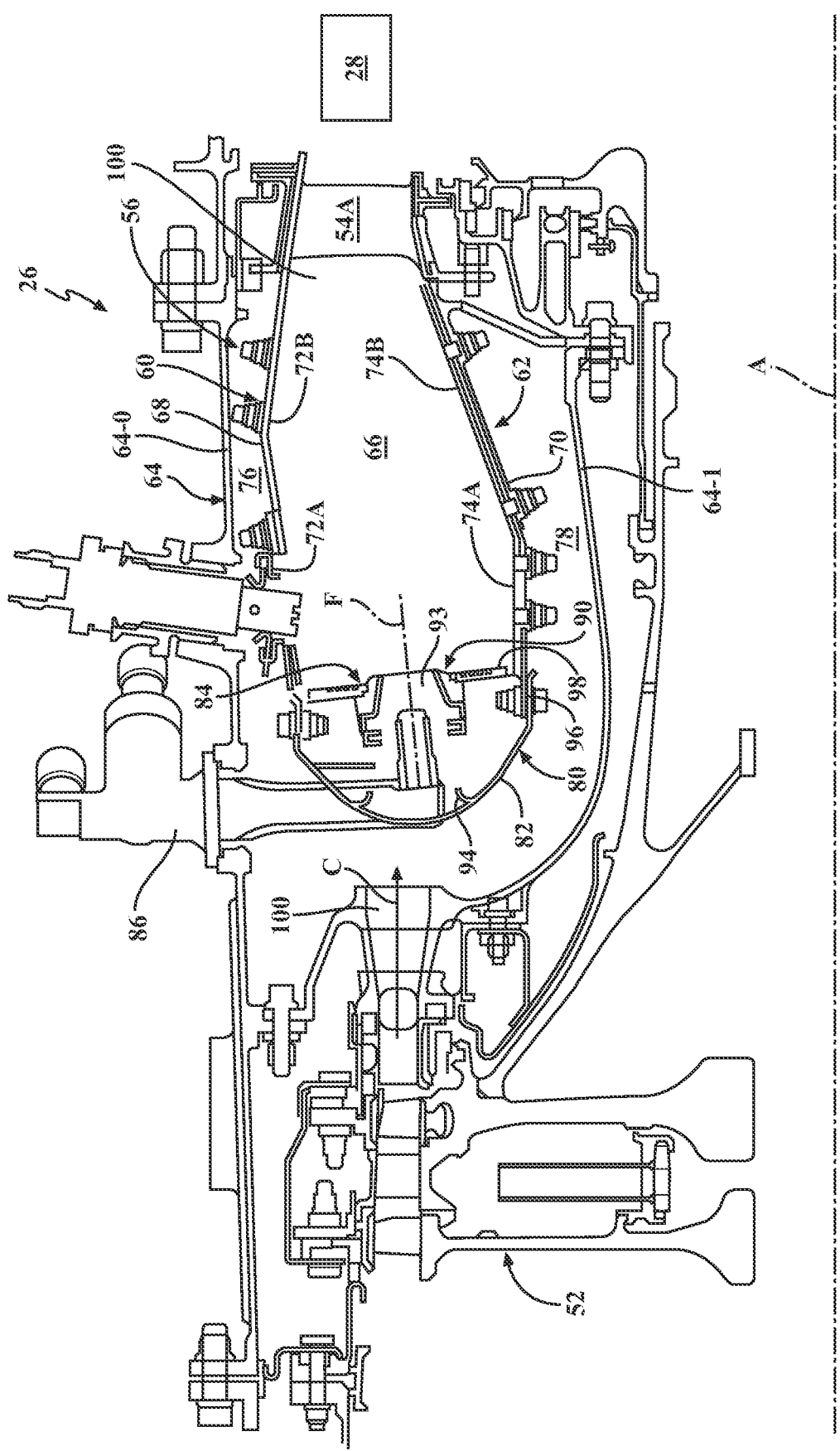
FIG. 2 is an expanded longitudinal schematic sectional view of a Rich-Quench-Lean combustor with a single fuel injection system that may be used with the example gas turbine engine.

With reference to FIG. 2, the combustor section 26 generally includes a combustor 56 with an outer combustor liner assembly 60, an inner combustor liner assembly 62 and a diffuser case module 64. The outer combustor liner assembly 60 and the inner combustor liner assembly 62 are spaced apart such that a combustion chamber 66 is defined therebetween. The combustion chamber 66 is generally annular in shape.

The outer combustor liner assembly 60 is spaced radially inward from an outer diffuser case 64-O of the diffuser case module 64 to define an outer annular plenum 76. The inner combustor liner assembly 62 is spaced radially outward from an inner diffuser case 64-I of the diffuser case module 64 to define an inner annular plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

In this example, the combustor liner assemblies 60, 62 contain the combustion products for direction toward the turbine section 28. Each combustor liner assembly 60, 62 generally includes a respective support shell 68, 70 which supports one or more liner panels 72, 74 mounted to a hot side of the respective support shell 68, 70. Although a dual wall liner assembly is illustrated, a single-wall liner may also benefit herefrom.

Each of the liner panels 72, 74 may be generally rectilinear and manufactured of, for example, a nickel based super alloy, ceramic or other temperature resistant material and are arranged to form a liner array. The liner array includes a multiple of forward liner panels 72A and a multiple of aft liner panels 72B that are circumferentially staggered to line the hot side of the outer shell 68 (also shown in FIG. 3). A multiple of forward liner panels 74A and a multiple of aft liner panels 74B are circumferentially staggered to line the hot side of the inner shell 70 (also shown in FIG. 3).

The combustor 56 further includes a forward assembly 80 immediately downstream of the compressor section 24 to receive compressed airflow therefrom. The forward assembly 80 generally includes an annular hood 82, a bulkhead assembly 84, a multiple of forward fuel nozzles 86 (one shown) and a multiple of swirlers 90 (one shown). The multiple of fuel nozzles 86 (one shown) and the multiple of swirlers 90 (one shown) define a fuel injection system 93 for a Rich-Quench-Lean (RQL) combustor that directs the fuel-air mixture into the combustor chamber generally along an axis F. The fuel injection system 93, in this embodiment, is the only fuel injection system.

The bulkhead assembly 84 includes a bulkhead support shell 96 secured to the combustor liner assemblies 60, 62, and a multiple of circumferentially distributed bulkhead liner panels 98 secured to the bulkhead support shell 96. The annular hood 82 extends radially between, and is secured to, the forwardmost ends of the combustor liner assemblies 60, 62. The annular hood 82 includes a multiple of circumferentially distributed hood ports 94 that accommodate the respective forward fuel nozzles 86 and direct air into the forward end of the combustion chamber 66 through a respective swirler 90. Each forward fuel nozzle 86 may be secured to the diffuser case module 64 and project through one of the hood ports 94 and through the respective swirler 90. Each of the fuel nozzles 86 is directed through the respective swirler 90 and the bulkhead assembly 84 along a respective axis F.

The forward assembly 80 introduces primary combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted to a first row of Nozzle Guide Vanes (NGVs) 54A in the HPT 54 to define a combustor exit 100. The NGVs 54A are static engine components which direct core airflow combustion gases onto the turbine blades of the first turbine rotor in the turbine section 28 to facilitate the conversion of pressure energy into kinetic energy. The combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 3:
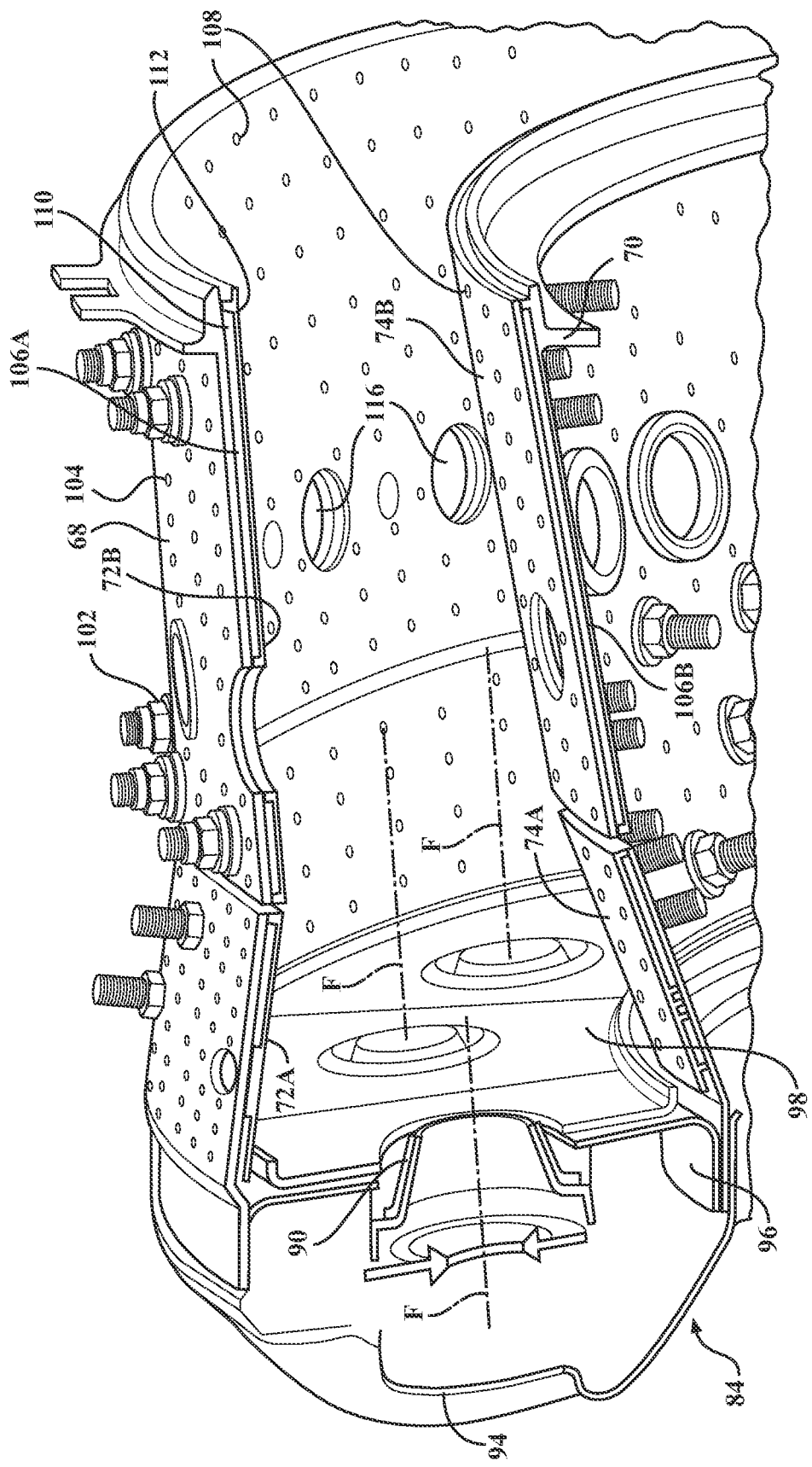
FIG. 3 is a perspective partial longitudinal sectional view of the combustor section.

With reference to FIG. 3, a multiple of cooling impingement holes 104 penetrate through the support shells 68, 70 to allow air from the respective annular plenums 76, 78 to enter cavities 106A, 106B formed in the combustor liner assemblies 60, 62 between the respective support shells 68, 70 and liner panels 72, 74. The cooling impingement holes 104 are generally normal to the surface of the liner panels 72, 74. The air in the cavities 106A, 106B provides cold side impingement cooling of the liner panels 72, 74 that is generally defined herein as heat removal via internal convection.

A multiple of cooling film holes 108 penetrate through each of the liner panels 72, 74. The geometry of the film holes, e.g., diameter, shape, density, surface angle, incidence angle, etc., as well as the location of the holes with respect to the high temperature main flow also contributes to effusion film cooling. The liner panels 72, 74 with a combination of impingement holes 104 and film holes 108 may sometimes be referred to as an Impingement Film Floatliner assembly. Other liner construction and cooling techniques may be used instead, such as a single-wall liner.

The cooling film holes 108 allow the air to pass from the cavities 106A, 106B defined in part by a cold side 110 of the liner panels 72, 74 to a hot side 112 of the liner panels 72, 74 and thereby facilitate the formation of a film of cooling air along the hot side 112. The cooling film holes 108 are generally more numerous than the impingement holes 104 to promote the development of a film cooling along the hot side 112 to sheath the liner panels 72, 74. Film cooling as defined herein is the introduction of a relatively cooler airflow at one or more discrete locations along a surface exposed to a high temperature environment to protect that surface in the immediate region of the airflow injection as well as downstream thereof. It should be appreciated that other combustors using an entirely different methods of combustor-liner cooling, including single-walled liners, backside-cooled liners, non-metallic CMC liners, etc., may alternatively be utilized.

A multiple of dilution holes 116 may penetrate through both the respective support shells 68, 70 and liner panels 72, 74 along a common axis downstream of the forward assembly 80 to dilute the hot gases by supplying cooling air and/or additional combustion air radially into the combustor. That is, the multiple of dilution holes 116 provide a direct path for airflow from the annular plenums 76, 78 into the combustion chamber 66. In other example combustors the fuel/air mixture in the combustor does not require dilution, and such a combustor may not require dilution holes.

Figure 4:
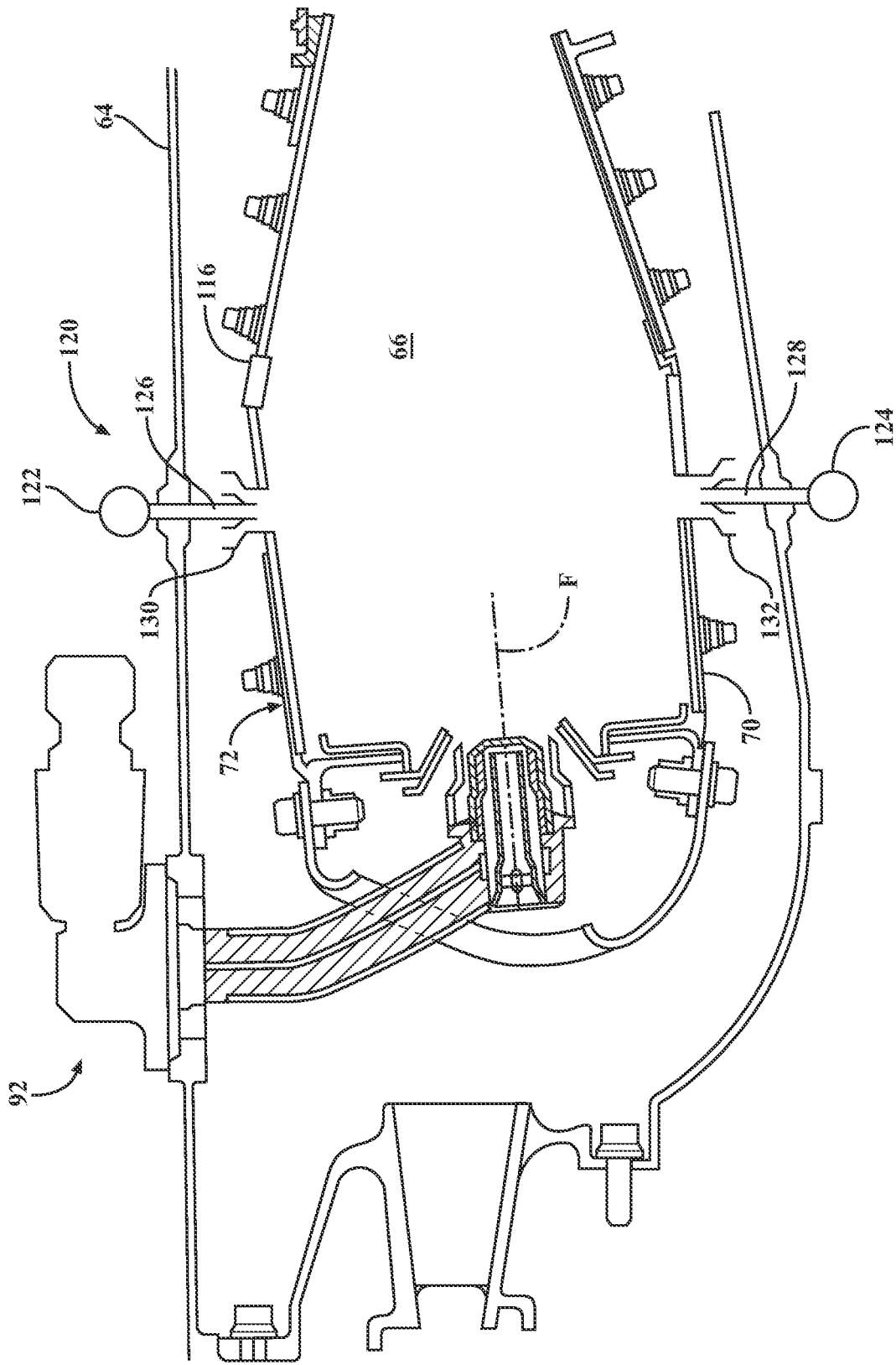
FIG. 4 is a schematic longitudinal sectional view of the combustor section which illustrates a forward axial pilot fuel injection system and a downstream radial fuel injections system according to one disclosed non-limiting embodiment.

With reference to FIG. 4, a main fuel injection system 120 communicates with the combustion chamber 66 downstream of an axial pilot fuel injection system 92 generally transverse to axis F of an Axially Controlled Stoichiometry (ACS) Combustor. Unlike an RQL combustor, where the dilution air leans out the fuel-rich mixture from the primary zone, a lean-burn combustor does not have a fuel-rich zone which requires dilution. The main fuel injection system 120 introduces a portion of the fuel required for desired combustion performance, e.g., emissions, operability, durability. In one disclosed non-limiting embodiment, the main fuel injection system 120 is positioned downstream of the axial pilot fuel injection system 92 and upstream of the multiple of dilution holes 116 if so equipped.

The main fuel injection system 120 generally includes an outer fuel injection manifold 122 (illustrated schematically) and/or an inner fuel injection manifold 124 (illustrated schematically) with a respective multiple of outer fuel nozzles 126 and a multiple of inner fuel nozzles 128. The outer fuel injection manifold 122 and/or inner fuel injection manifold 124 may be mounted to the diffuser case module 64 and/or to the shell 68, 70, however, various mount arrangements may alternatively or additionally provided.

Each of the multiple of outer and inner fuel nozzles 126, 128 are located within a respective mixer 130, 132 to mix the supply of fuel into the pressurized air within the diffuser case module 64 as it passes through the mixer to enter the combustion chamber 66. As defined herein, a "mixer" as compared to a "swirler" may generate, for example, zero swirl, a counter-rotating swirl, a specific swirl which provides a resultant swirl or a residual net swirl which may be further directed at an angle. It should be appreciated that various combinations thereof may alternatively be utilized.

The main fuel injection system 120 may include only the radially outer fuel injection manifold 122 with the multiple of outer fuel nozzles 126; only the radially inner fuel injection manifold 124 with the multiple of inner fuel nozzles 128; or both (shown). Alternatively, the main fuel injection system 120 may only be located in the bulkhead assembly 84. It should be appreciated that the main fuel injection system 120 may include single sets of outer fuel nozzles 126 and inner fuel nozzles 128 (shown) or multiple axially distributed sets of, for example, relatively smaller fuel nozzles.

Figure 5:
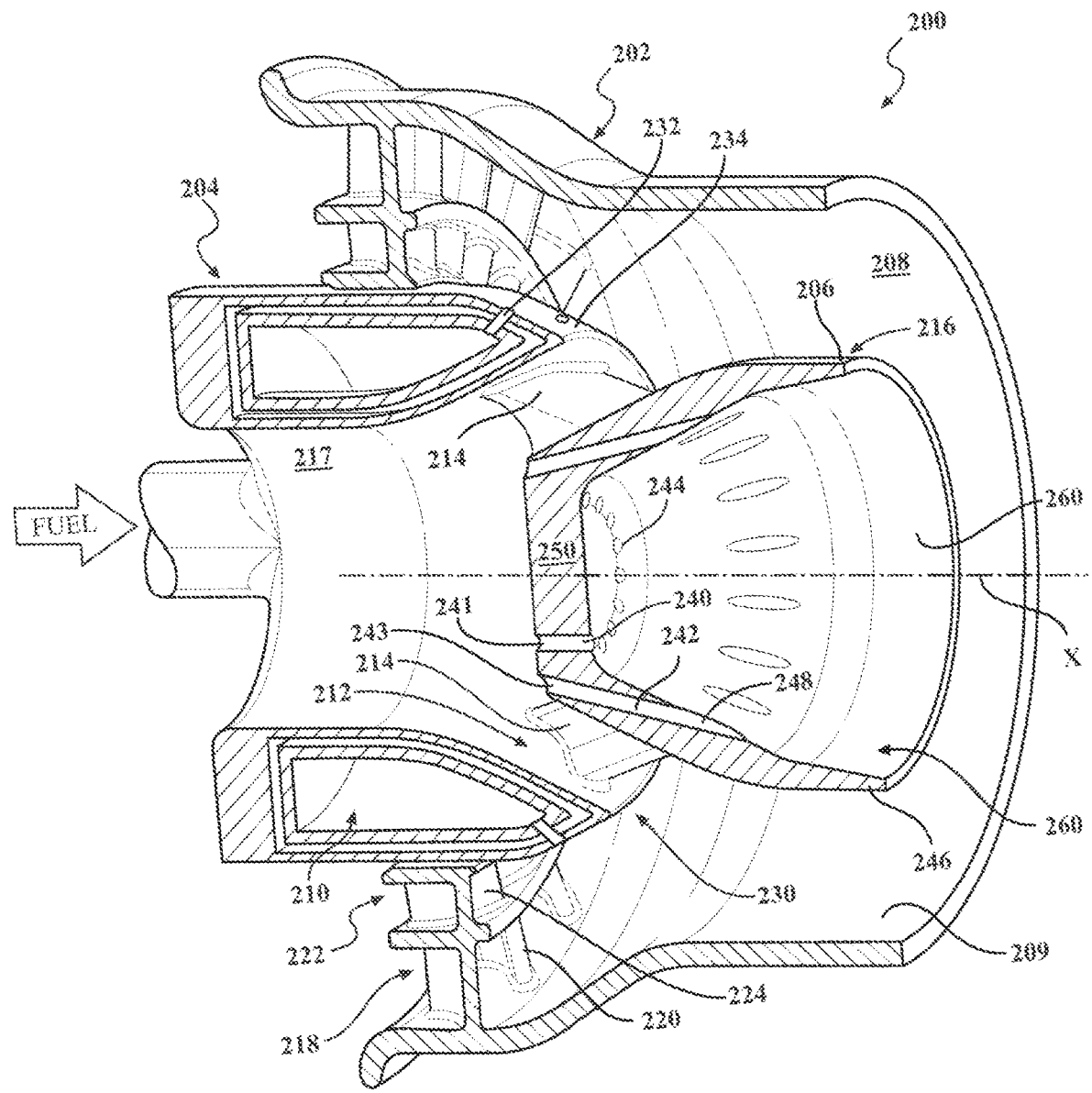
FIG. 5 is a perspective partial sectional view of a main mixer, viewed looking upstream, according to another disclosed non-limiting embodiment.
Figure 6:
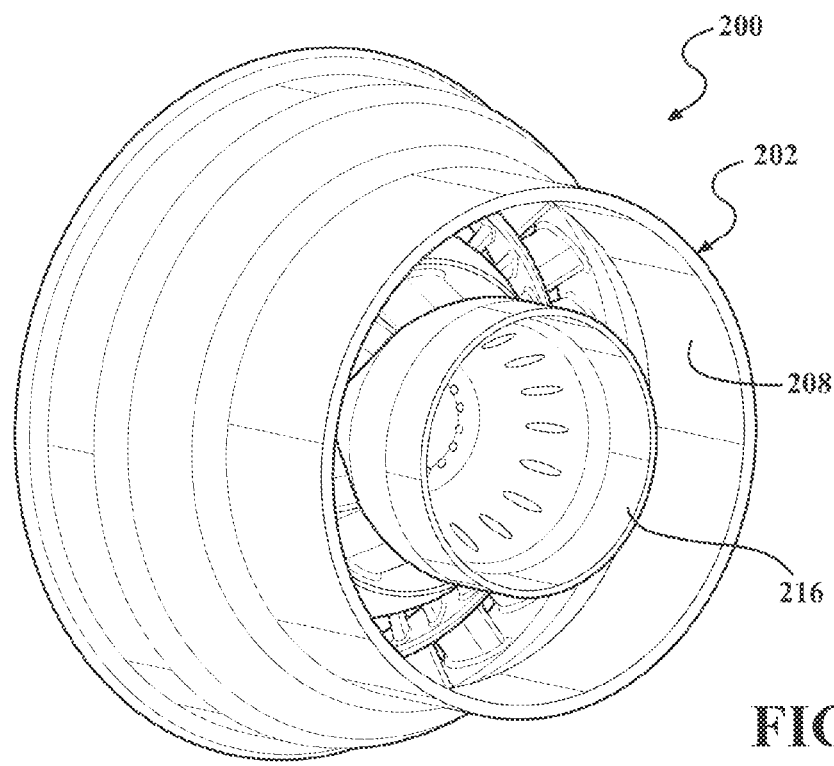
FIG. 6 is an upstream perspective view of the main mixer of FIG. 5.
Figure 7:
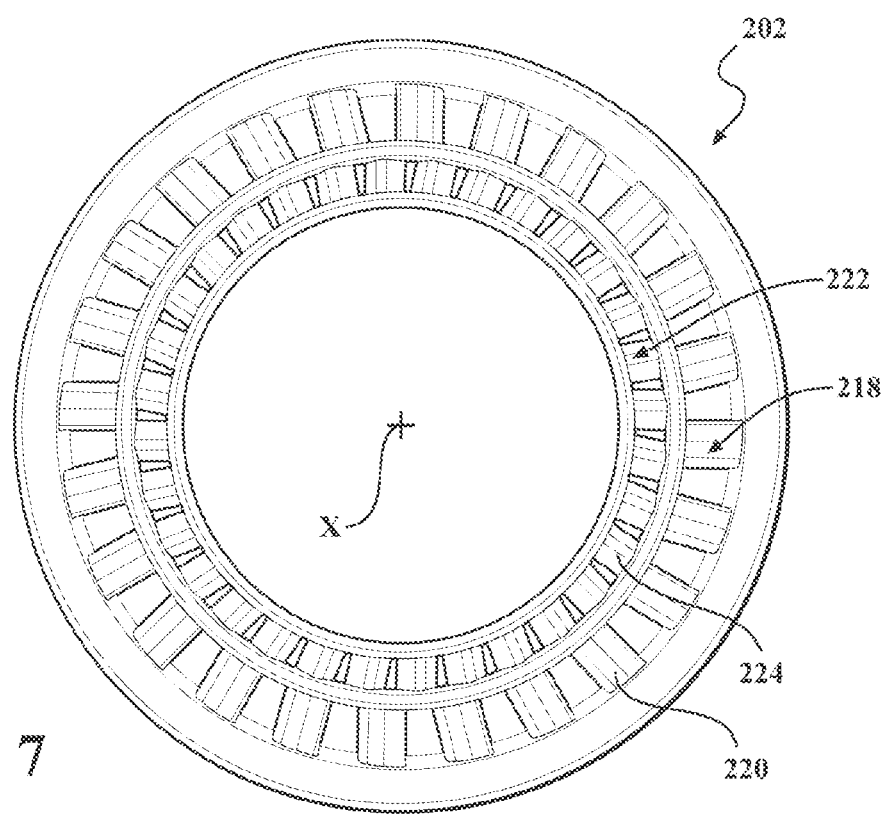
FIG. 7 is a downstream view of the swirler of the main mixer of FIG. 5.
Figure 8:
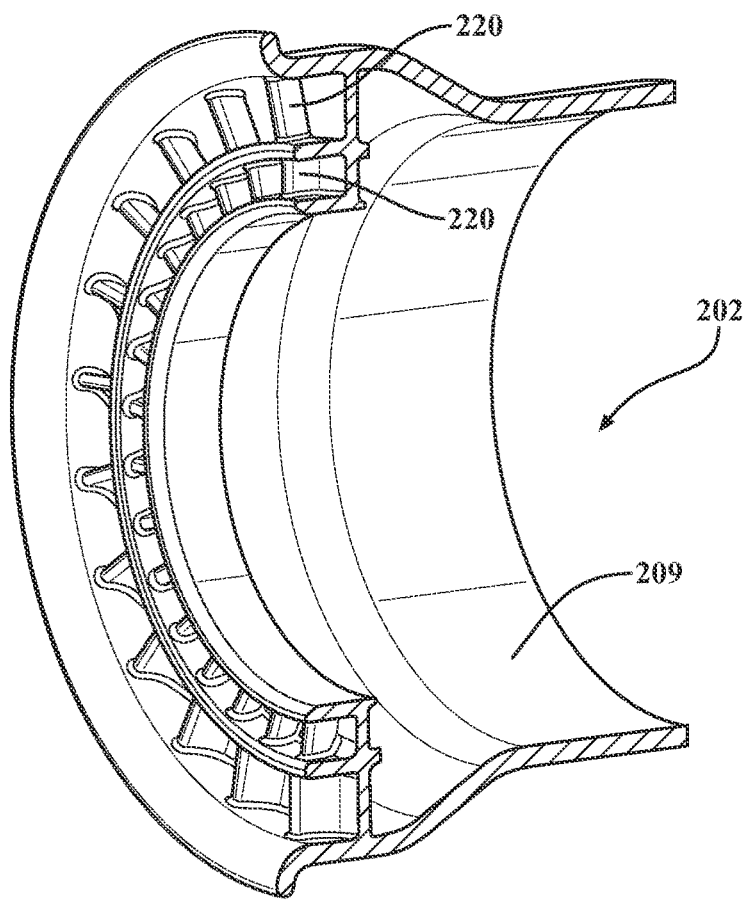
FIG. 8 is a perspective view of the swirler of the main mixer of FIG. 5.
Figure 9:
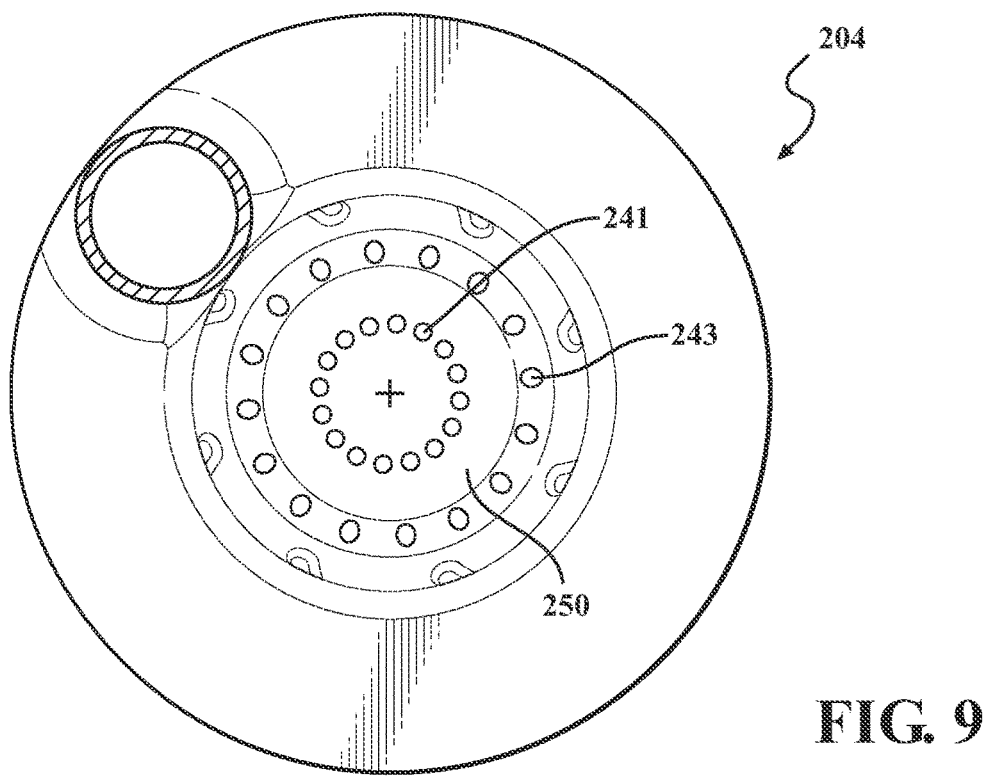
FIG. 9 is an aft view of the centerbody of the main mixer of FIG. 5.
Figure 10:
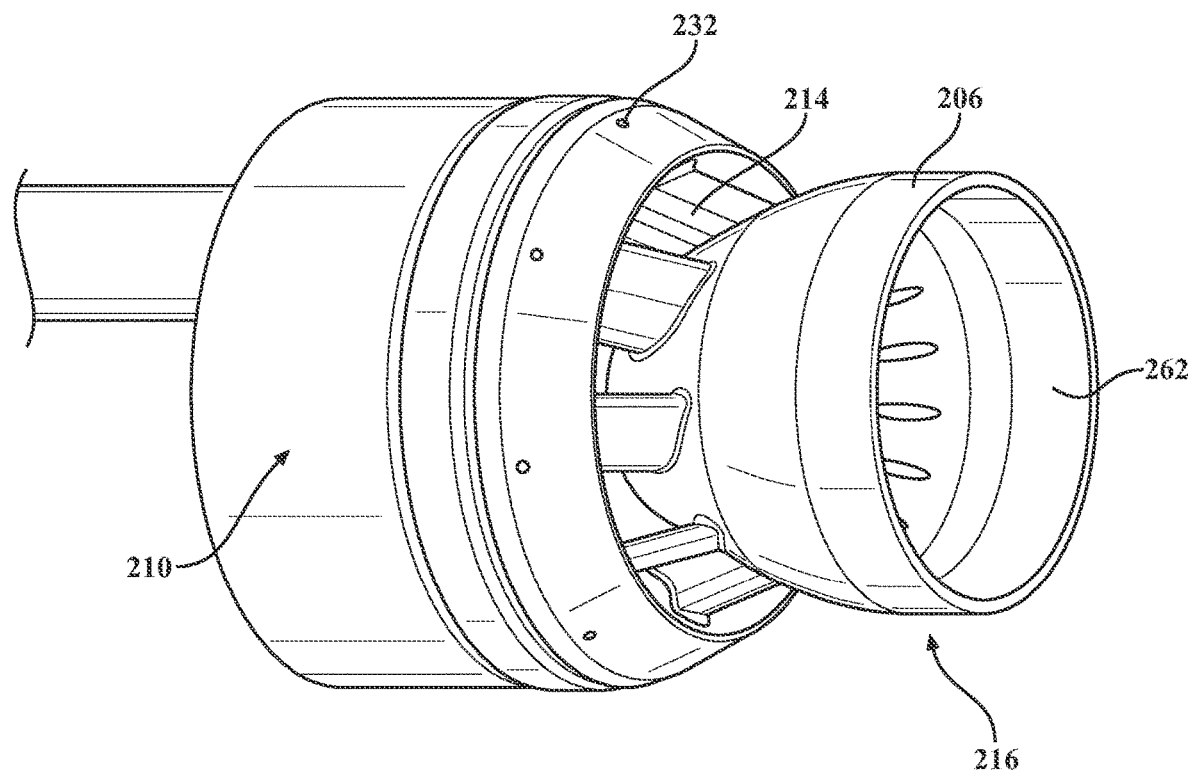
FIG. 10 is a perspective view of the swirler hub of the main mixer of FIG. 5.
Figure 11:
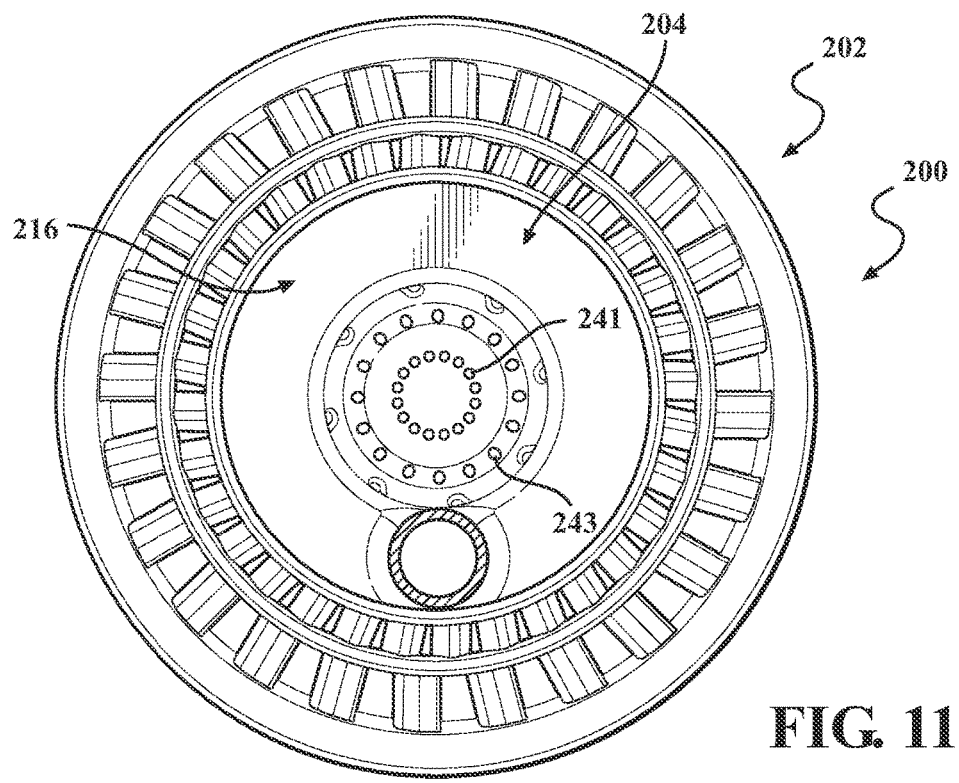
FIG. 11 is a downstream view of the main mixer of FIG. 5.
Figure 12:
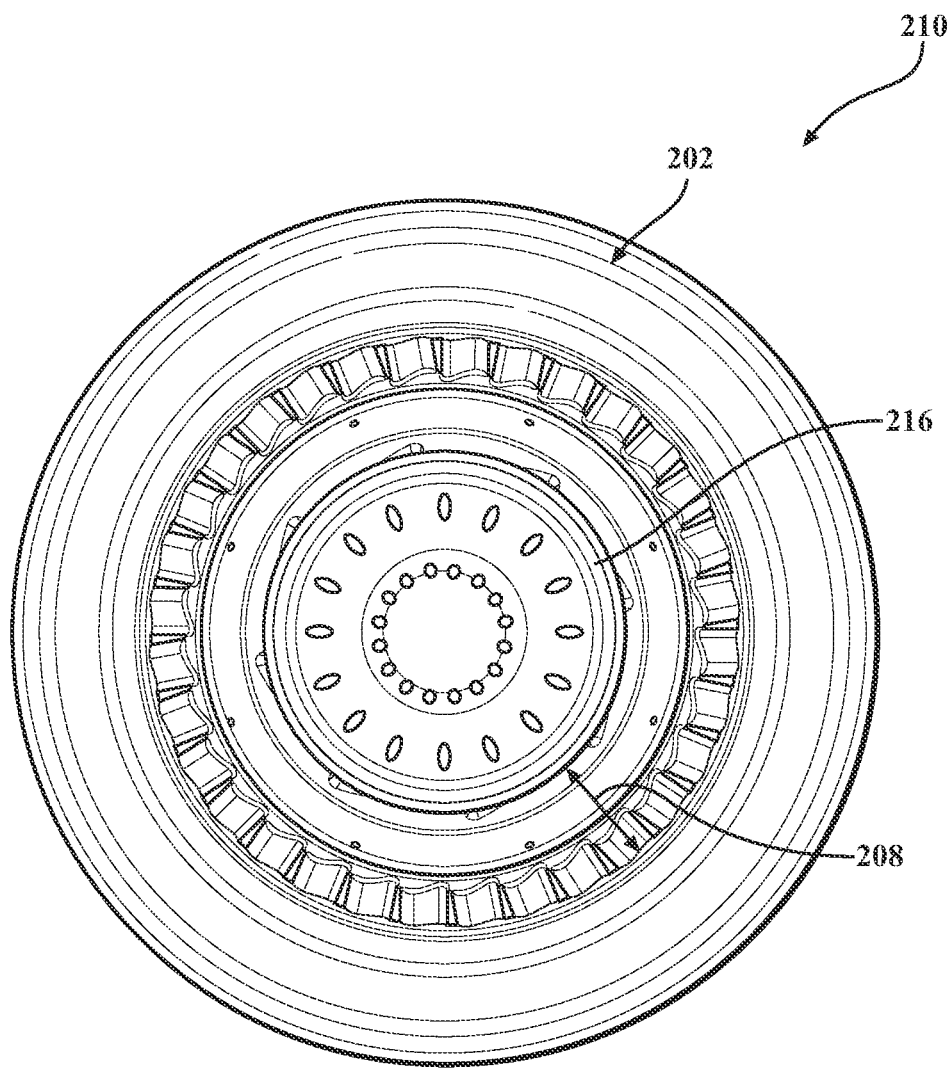
FIG. 12 is an upstream view of the main mixer of FIG. 5.

With reference to FIG. 5 and FIG. 6, each of the multiple of outer and inner fuel nozzles 126, 128 are respectively located within the associated mixer 130, 132 to each form an annular main mixer 200 (one shown). Each annular main mixer 200 generally includes a swirler body 202 (FIGS. 7 and 8) and a swirler hub 204 (FIGS. 9 and 10) along a common main mixer axis X (FIGS. 11 and 12).

The swirler hub 204 generally includes a fuel manifold 210, and an inner swirler 212 with a multiple of inner vanes 214 that supports a centerbody 216. The inner vanes 214 may or may not have an aerodynamic aspect and thus may be more particularly described as struts or attachment points. The outer surface 206 of the centerbody 216 forms an inner diameter of an annular mixer passage 208 while an inner diameter 209 of the swirler forms an outer diameter of the annular mixer passage 208. In one example, a ratio of the gap height of the annular mixer passage 208 to the swirler hub 204 radius ranges from 0.2 to 1.2. The apex (stagnation-point) and the attachment points for the swirler hub 204 are in a pure air stream passing through the center of hub 204, which because of the absence of fuel, precludes the possibility of flameholding and overheating of the swirler hub 204.

The swirler body 202 includes an outer swirler 218 with a multiple of outer vanes 220, and a center swirler 222 with a multiple of center vanes 224. The outer swirler 218 defines a diameter generally larger than the annular mixer passage 208 diameter. That is, the inner diameter 209 decreases downstream of the outer swirler 218.

In one embodiment, the multiple of outer vanes 220 are formed to counter-rotate with the multiple of center vanes 224 and to co-rotate with respect to the inner vanes 214 if they impart swirl. The airflow from the inner swirler 212 enhances mixing by providing a shear layer to increase fuel jet penetration as well as minimize or eliminate the low velocity region associated with airflow swirl and fuel jets. In one example, air flow from inner swirler takes 20% to 45% of total main mixer air flow, the center swirler takes 30% to 40% of total main mixer air flow, and outer swirler takes 30% to 50% of total main mixer air flow and the cross sectional area from where the inner air meets the air flow from center and outer to the mixer exit generally remain constants or slightly converging.

The multiple of inner vanes 214 interconnect the fuel manifold 210 and the centerbody 216 (FIG. 10) to define an unfueled annular air passage 217. The unfueled annular air passage 217 avoids burning (no overheating) upstream of the multiple of inner vanes 214 and/or upstream of the cooling features of the centerbody 216.

The fuel manifold 210 includes a downstream section 230 with a multiple of fuel jets 232 that extend through an outer surface 234 of the fuel manifold 210. The multiple of fuel jets 232 may form an angle with respect to the center main mixer axis X of the mixer or may be otherwise oriented and/or arranged. The angle from where the inner air meets the air flow from center and outer to the mixer exit ranges from 0 to 30 degrees. The multiple of fuel jets 232 thereby inject fuel generally outward into the airflow downstream of the outer swirler 218 and the center swirler 222.

The centerbody 216 may be a conical, frustro-conical, cylindrical, or other shape. The centerbody 216 may include a first multiple of effusion/film cooling passages 240 and a second multiple of effusion/film cooling passages 242 (FIG. 6). The first multiple of effusion/film cooling passages 242 may include inlets 241 arranged in a circular distribution in an upstream wall 250 (FIG. 6) of the centerbody 216 to define circular exits 244. The multiple of effusion/film cooling passages 242 may also include inlets 243 (FIG. 6) arranged in a circular distribution in the upstream wall 250 of the centerbody 216 and extend through a sidewall 246 to form non-circular exits 248. That is, the second multiple of effusion/film cooling passages 242 extend through the sidewall 246 to exit obliquely through an interior of the centerbody 216. It should be appreciated that other hole shapes and locations could also be employed other than the illustrated round holes in circular patterns.

An inner surface 260 of the centerbody 216 may be coated with a thermal barrier coatings (TBC). The TBC is typically a ceramic material deposited on a bond coat to form what may be termed a TBC system. Bond coat materials widely used in TBC systems include oxidation-resistant overlay coatings such as MCrAlX (where M is iron, cobalt and/or nickel, and X is yttrium or another rare earth element), and diffusion coatings such as diffusion aluminides that contain aluminum intermetallics. Ceramic materials and particularly binary yttria-stabilized zirconia (YSZ) are widely used as TBC materials because of their high temperature capability, low thermal conductivity, and relative ease of deposition such as by air plasma spraying (APS), flame spraying such as hyper-velocity oxy-fuel (HVOF), physical vapor deposition (PVD) and other techniques.

The multiple of impingement cooling passages 240 provide backside impingement cooling in the center region and backside convective cooling away from the center region. In one example, typical impingement and convective cooling velocity ranges from 50 to 150 m/sec for cooling, or to minimize flame propagation upstream thereof. The second multiple of effusion/film cooling passages 242 provide additional convective cooling to generate film cooling along the inner surface 260. The flow from the second multiple of effusion/film cooling passages 242 may have a tangential angle to the inner surface to provide swirling cooling flow. In one example, total cooling flow utilizes less than 1% of combustor chamber cooling flow. Fuel injection within the mixer lowers the temperature of the backside cooling flow, providing further cooling benefit.

The integral annular main mixer 200 provides for stable and robust anchoring/flameholding of the main zone reacting jet, which facilitates good combustion efficiency, improved dynamic stability, prevention of intermittent flame lift-off, and potential mitigation of combustion dynamics. Further, the integral annular main mixer 200 enhances flame stability by contact with burned gases in these regions. Fuel shifting or fuel biasing can be used to create a richer F/A mixture at a specific location where the flame anchoring is desired. Fuel shifting and fuel biasing for a liquid-fueled aero engine axially-staged lean-lean combustor configuration may be provided by radial fuel re-distribution within the swirler, and/or non-uniform circumferential distribution within or with respect to the swirler. Fuel shifting may also be applied between one swirler or mixer and another, or between sets of swirlers or mixers.

Figure 13:
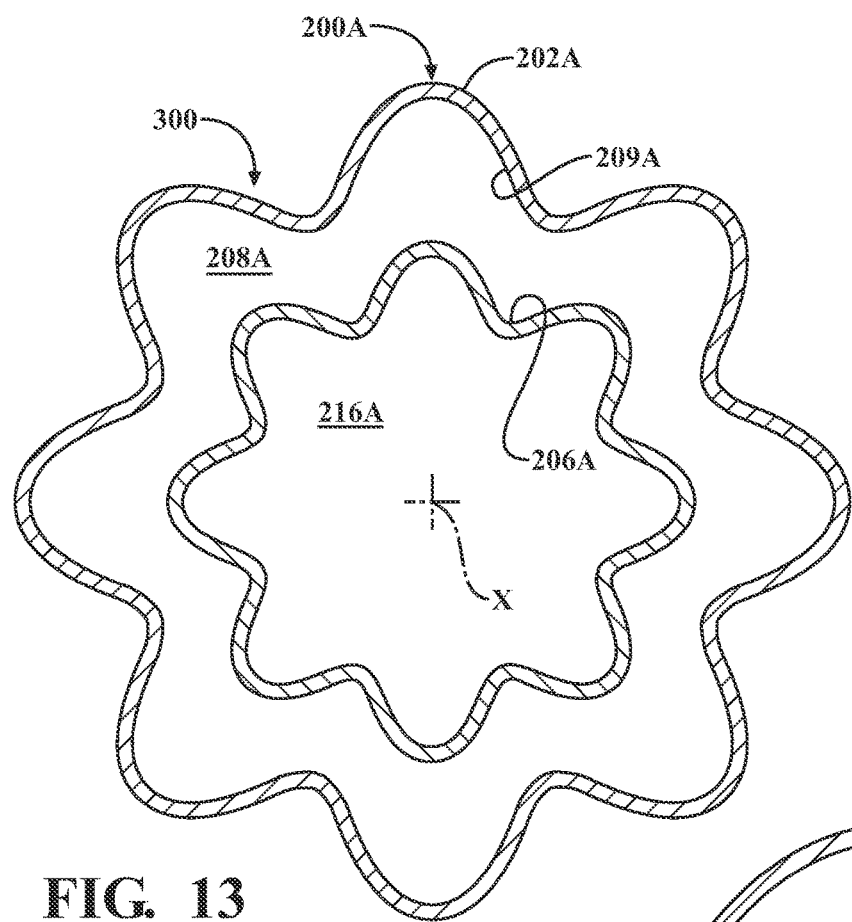
FIG. 13 is a front view of the swirler hub of the main mixer according to another disclosed non-limiting embodiment.

With reference to FIG. 13, an integral annular main mixer 200A in accords with another disclosed non-limiting embodiment is of a lobed shape 300. That is, the outer surface 206A of the center section 216A forms a non-circular inner surface of the annular mixer passage 208A while an inner diameter 209A of the swirler body 202A forms an outer surface of the annular mixer passage 208A.

Figure 14:
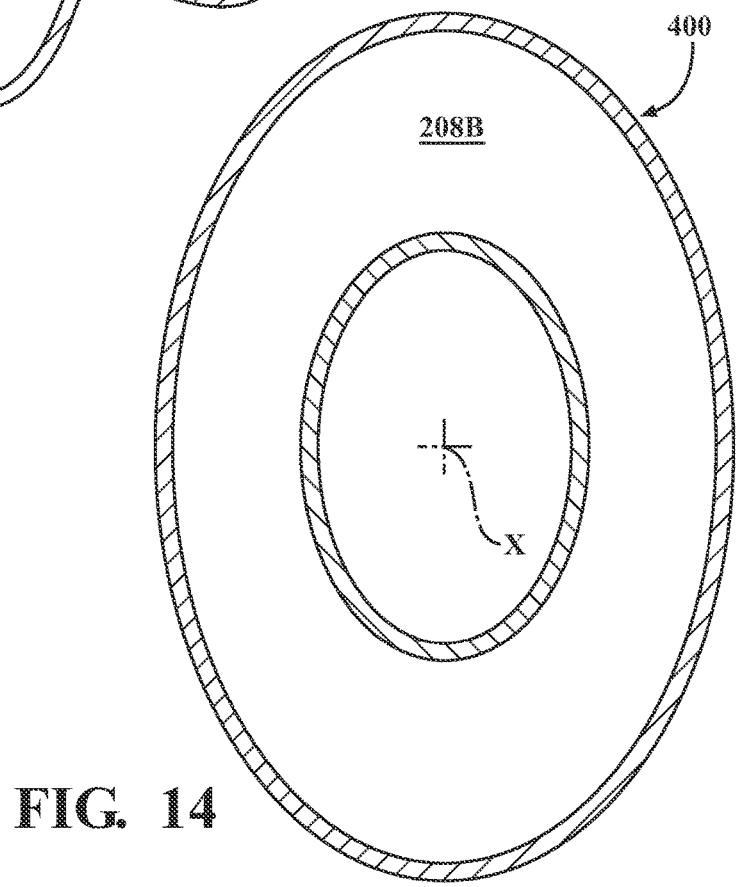
FIG. 14 is a front view of the swirler hub of the main mixer according to another disclosed non-limiting embodiment.
Figure 15:
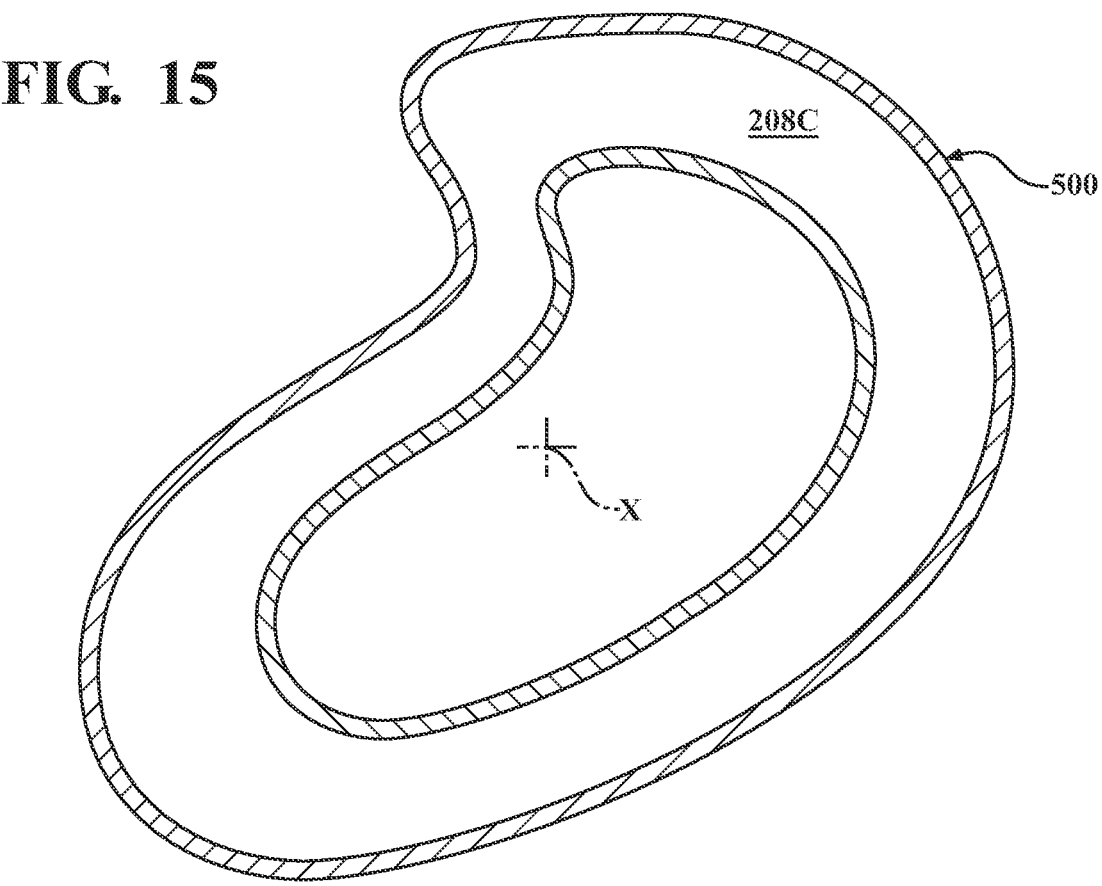
FIG. 15 is a front view of the swirler hub of the main mixer according to another disclosed non-limiting embodiment.

With reference to FIG. 14, an annular main mixer exit passage 208B in accords with another disclosed non-limiting embodiment is of an elliptical shape 400. With reference to FIG. 15, an annular main mixer exit passage 208C in accords with another disclosed non-limiting embodiment is of a contoured shape 500. Various other shapes may alternatively or additionally be provided. That is, the annular mixer passage 208 need not be circular or coaxial with the main mixer axis X to address addresses known ACS complications such as main mixer scalability; main mixer sooting potential; fuel nozzle count reduction; and cruise efficiency.

Figure 16:
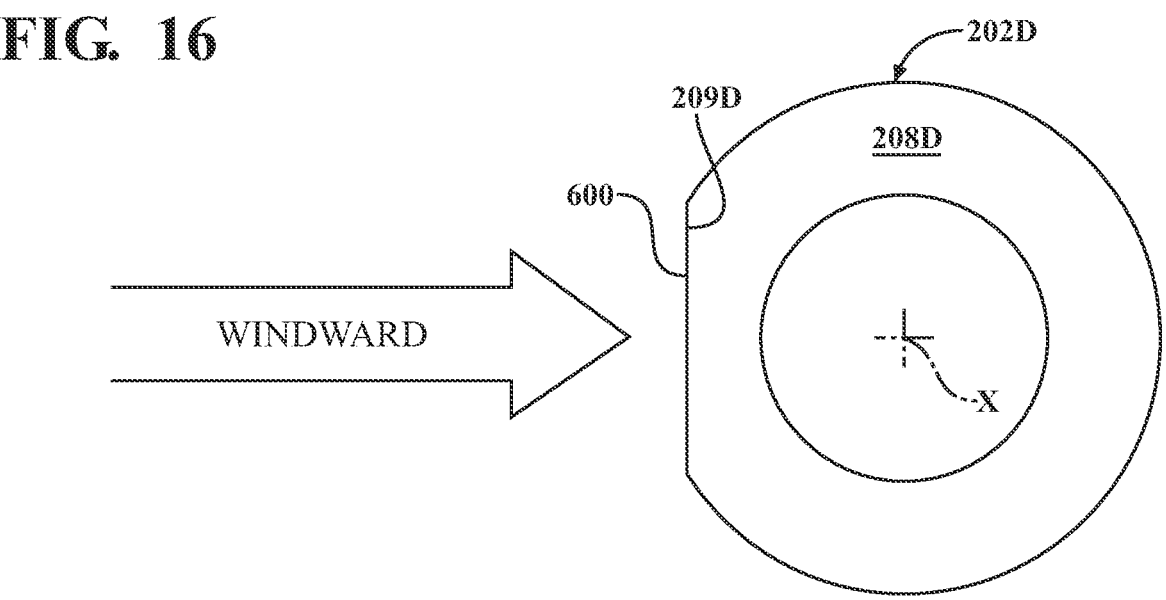
FIG. 16 is a front view of the swirler hub of the main mixer according to another disclosed non-limiting embodiment.
Figure 17:
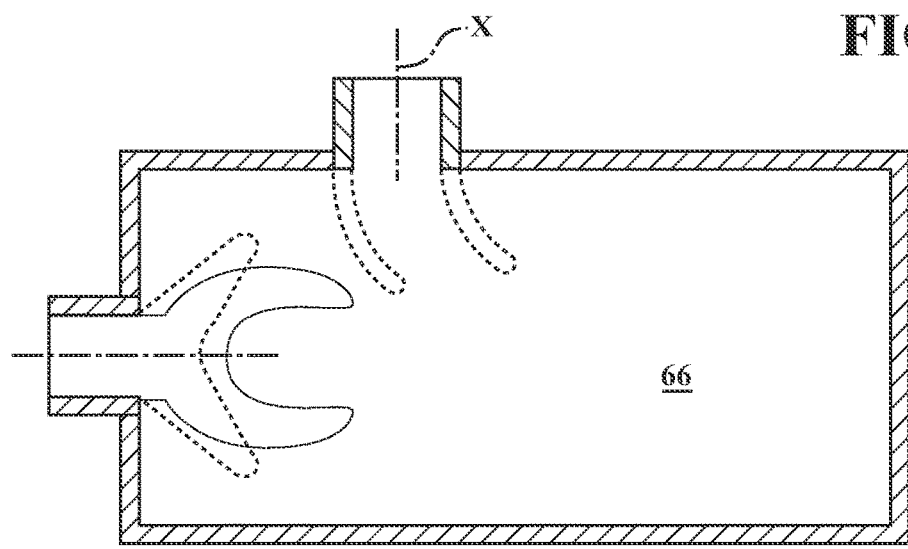
FIG. 17 is a front view of the swirler hub of the main mixer according to another disclosed non-limiting embodiment.

With reference to FIG. 16, an annular main mixer exit passage 208D in accords with another disclosed non-limiting embodiment includes a flat leading edge 600 on the inner diameter 209D of the swirler body 202D. That is, the flat leading edge 600 on the inner diameter 209D of the swirler body 202D is on the windward side with respect to the flow through the combustion chamber 66 (FIG. 17).

Figure 18:
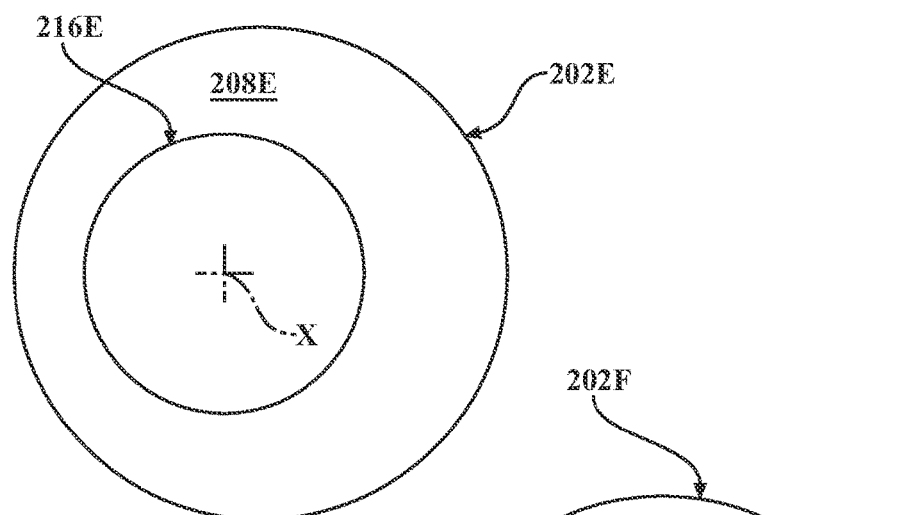
FIG. 18 is a front view of the swirler hub of the main mixer according to another disclosed non-limiting embodiment.

With reference to FIG. 18, an annular main mixer exit passage 208E in accords with another disclosed non-limiting embodiment, offsets the centerbody 216E within the swirler body 202E to form a non-axis symmetric annular mixer passage 208E. In this embodiment, the centerbody 216E is offset within the swirler body 202E toward the windward side.

Figure 19:
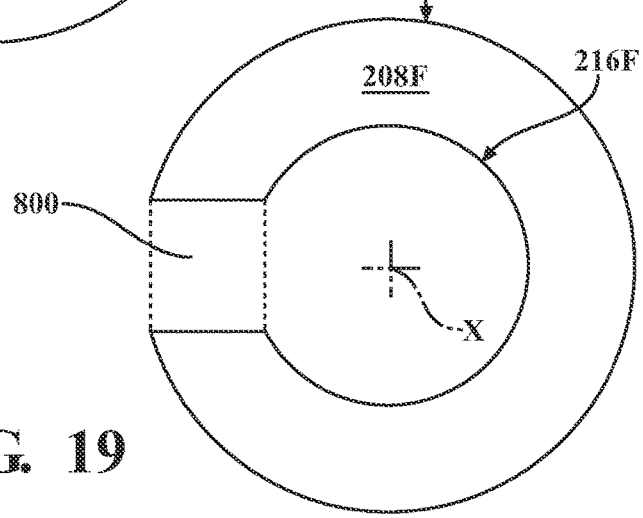
FIG. 19 is a front view of the swirler hub of the main mixer according to another disclosed non-limiting embodiment.

With reference to FIG. 19, an annular main mixer exit passage 208F in accords with another disclosed non-limiting embodiment includes an aperture 800 through the swirler body 202F. That is, the aperture 800 on the inner diameter 209F of the swirler body 202F is on the windward side with respect to the flow through the combustion chamber 66.

The annular main mixer 200 includes annular main mixers having concentric counter-rotating axial and/or radial swirler vane passages, an annular fuel plenum from which fuel is injected (preferably between concentric vane passages), and a swirler hub that can take various shapes but which together with the outer wall defines the annular mixer exit. Since the annular main mixer 200 is the main-stage in an ACS combustor, a pilot is not required, and is not included in the mixer, and bulk swirl is minimal and not required, thus the design and operation is itself different from mixers used in non-ACS combustors.

The annular main mixer 200 provides for stable and robust anchoring/flameholding of the main zone reacting jet, which facilitates mitigation of combustion dynamics, improved dynamic stability, and prevention of intermittent flame lift-off. Further, the annular main mixer 200 enhances flame stability by contact with burned gases in these regions. Fuel shifting or fuel biasing can be used to create a richer F/A mixture at a specific location where the flame anchoring is desired. Fuel shifting and fuel biasing for a liquid-fueled aero engine axially-staged lean-lean combustor configuration may be provided by radial fuel re-distribution within the swirler, and/or non-uniform circumferential distribution within or with respect to the swirler.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

The invention claimed is:

1. A main mixer, comprising:
a swirler along an axis; and
a swirler hub along the axis, the swirler hub having a fuel manifold and a centerbody, the centerbody forms an inner surface of a contoured annular mixer passage, and an inner surface of the swirler forms an outer surface of the contoured annular mixer passage, wherein the centerbody of the swirler hub forms a non-circular inner surface of the contoured annular mixer passage and an inner surface of the swirler forms a non-circular outer surface of the contoured annular mixer passage, and wherein an outer surface of the centerbody of the swirler hub forms a multiple of lobes of the contoured annular mixer passage and the inner surface of the swirler forms a multiple of lobes of the contoured annular mixer passage.

2. The main mixer as recited in claim 1, wherein an inner surface of the centerbody is coated with a thermal barrier coatings (TBC).

3. The main mixer as recited in claim 2, wherein the centerbody includes a fuel manifold and an inner swirler with a multiple of inner vanes that support the centerbody, the multiple of inner vanes interconnect the fuel manifold and the centerbody.

4. The main mixer as recited in claim 3, wherein the swirler includes an outer swirler with a multiple of outer vanes, and a center swirler with a multiple of center vanes.

5. The main mixer as recited in claim 1, wherein the centerbody of the swirler hub is offset from the axis.

6. The main mixer as recited in claim 1, wherein an inner surface of the swirler includes an aperture on a windward side thereof.

7. The main mixer as recited in claim 1, wherein an inner surface of the swirler includes a flat on a windward side thereof.

8. A main mixer, comprising:
a swirler along an axis; and
a swirler hub including a fuel manifold and an inner swirler with a multiple of inner vanes that support a centerbody, the multiple of inner vanes interconnect the fuel manifold and the centerbody, the centerbody offset from the axis, the centerbody forms an inner surface of a contoured annular mixer passage, and an inner surface of the swirler forms an outer surface of the contoured annular mixer passage, wherein the centerbody of the swirler hub forms a non-circular inner surface of the contoured annular mixer passage and an inner surface of the swirler forms a non-circular outer surface of the contoured annular mixer passage, and wherein an outer surface of the centerbody of the swirler hub forms a multiple of lobes of the contoured annular mixer passage and the inner surface of the swirler forms a multiple of lobes of the contoured annular mixer passage.

9. The main mixer as recited in claim 8, wherein an inner surface of the swirler includes an aperture on a windward side thereof.

10. The main mixer as recited in claim 8, wherein an inner surface of the swirler includes a flat on a windward side thereof.

11. The main mixer as recited in claim 8, wherein the fuel manifold is located along the axis.

12. A main mixer, comprising:
a swirler including an outer swirler with a multiple of outer vanes, and a center swirler with a multiple of center vanes; and
a swirler hub including a fuel manifold and an inner swirler with a multiple of inner vanes that support a centerbody, the multiple of inner vanes interconnect the fuel manifold and the centerbody, a non-circular outer surface of the centerbody and a non-circular inner surface of the swirler define a non-circular annular mixer passage, wherein an outer surface of the centerbody of the swirler hub forms a multiple of lobes of the contoured annular mixer passage and the inner surface of the swirler forms a multiple of lobes of the contoured annular mixer passage.

13. The main mixer as recited in claim 12, wherein the centerbody includes a multiple of effusion/film cooling passages arranged in a circular distribution through an upstream wall of the centerbody to extend through a sidewall and form non-circular exits.

14. The main mixer as recited in claim 13, wherein the centerbody includes a multiple of impingement cooling passages arranged in a circular distribution in the upstream wall of the centerbody.

* * * * *